United States Patent
Ash et al.

(10) Patent No.: US 7,684,103 B2
(45) Date of Patent: *Mar. 23, 2010

(54) CONTROLLABLY DISSOLVING SPACING MEMBER AND ASSOCIATED ELECTROCHROMIC DEVICE AND METHOD FOR MANUFACTURING THE SAME

(75) Inventors: Kevin L. Ash, Grand Rapids, MI (US); Leroy J. Kloeppner, Jenison, MI (US); Steven J. Veenman, Holland, MI (US); Michelle M. Carroll, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/218,212

(22) Filed: Jul. 11, 2008

(65) Prior Publication Data

US 2009/0027756 A1   Jan. 29, 2009

Related U.S. Application Data

(63) Continuation of application No. 11/416,557, filed on May 3, 2003, now Pat. No. 7,414,770.

(51) Int. Cl.
*G02F 1/15* (2006.01)
*G09G 3/38* (2006.01)

(52) U.S. Cl. .................. 359/265; 345/105
(58) Field of Classification Search .......... 345/105; 359/265, 267, 268, 270, 273, 274
See application file for complete search history.

(56) References Cited

U.S. PATENT DOCUMENTS

| | | | |
|---|---|---|---|
| 4,048,374 A | 9/1977 | Kotzsch et al. | |
| 4,297,401 A | 10/1981 | Chern et al. | |
| 4,418,102 A | 11/1983 | Ferrato | |
| 4,433,015 A | 2/1984 | Lindert | |
| 4,497,890 A | 2/1985 | Helbert | |
| 4,558,924 A | 12/1985 | Sautter | |
| 4,605,693 A | 8/1986 | Mowdood | |
| 4,645,714 A | 2/1987 | Roche et al. | |
| 4,690,715 A | 9/1987 | Allara et al. | |
| 4,695,490 A | 9/1987 | McClelland et al. | |
| 4,716,185 A | 12/1987 | Rabener et al. | |
| 4,788,235 A | 11/1988 | Johnson | |
| 4,902,108 A | 2/1990 | Byker | |
| 5,096,980 A | 3/1992 | Yamazaki et al. | |
| 5,186,783 A | 2/1993 | Kawashima et al. | |

(Continued)

FOREIGN PATENT DOCUMENTS

WO   PCT/US98/05570   3/1998

(Continued)

*Primary Examiner*—David N Spector
(74) *Attorney, Agent, or Firm*—King & Partners, PLC

(57) ABSTRACT

An electrochromic device including a first substantially transparent substrate having an electrically conductive material associated therewith; a second substrate having an electrically conductive material associated therewith; an electrochromic medium contained within a chamber positioned between the first and second substrates which includes at least one solvent, at least one anodic material, and at least one cathodic material, wherein the first and second substrates are substantially uniformly spaced apart by a spacing member comprising a non-polymeric material which substantially dissolves upon association with the at least one solvent.

19 Claims, 2 Drawing Sheets

U.S. PATENT DOCUMENTS

| | | | |
|---|---|---|---|
| 5,202,787 | A | 4/1993 | Byker et al. |
| 5,233,461 | A | 8/1993 | Dornan et al. |
| 5,254,198 | A | 10/1993 | Kawashima et al. |
| 5,288,341 | A | 2/1994 | Kojima et al. |
| 5,552,092 | A | 9/1996 | Francis et al. |
| 5,596,023 | A | 1/1997 | Tsubota et al. |
| 5,596,024 | A | 1/1997 | Horie et al. |
| 5,712,039 | A | 1/1998 | Marhevka et al. |
| 5,724,187 | A | 3/1998 | Varaprasad et al. |
| 5,750,197 | A | 5/1998 | Van Ooij et al. |
| 5,790,298 | A | 8/1998 | Tonar |
| 5,818,625 | A | 10/1998 | Forgette et al. |
| 5,928,572 | A | 7/1999 | Tonar et al. |
| 5,940,201 | A | 8/1999 | Ash et al. |
| 5,998,617 | A | 12/1999 | Srinivasa et al. |
| 6,020,987 | A | 2/2000 | Baumann et al. |
| 6,037,471 | A | 3/2000 | Srinivasa et al. |
| 6,137,620 | A | 10/2000 | Guarr et al. |
| 6,141,137 | A | 10/2000 | Byker et al. |
| 6,157,480 | A | 12/2000 | Anderson et al. |
| 6,188,505 | B1 | 2/2001 | Lomprey et al. |
| 6,188,555 | B1 | 2/2001 | Mitlehner et al. |
| 6,193,378 | B1 | 2/2001 | Tonar et al. |
| 6,193,912 | B1 | 2/2001 | Thieste et al. |
| 6,195,193 | B1 | 2/2001 | Anderson et al. |
| 6,239,898 | B1 | 5/2001 | Byker et al. |
| 6,241,916 | B1 | 6/2001 | Claussen et al. |
| 6,246,507 | B1 | 6/2001 | Bauer et al. |
| 6,249,369 | B1 | 6/2001 | Theiste et al. |
| 6,597,489 | B1 | 7/2003 | Guarr et al. |
| 6,614,578 | B2 | 9/2003 | Giri et al. |
| 6,635,194 | B2 | 10/2003 | Kloeppner et al. |
| 6,700,693 | B2 | 3/2004 | Roberts et al. |
| 6,710,906 | B2 | 3/2004 | Guarr et al. |
| 6,783,099 | B2 | 8/2004 | Rukavina et al. |
| 6,816,297 | B1 | 11/2004 | Tonar et al. |
| 6,842,276 | B2 | 1/2005 | Poll et al. |
| 7,001,540 | B2 | 2/2006 | Kloeppner et al. |
| 7,414,770 | B2 * | 8/2008 | Ash et al. .................. 359/265 |
| 2002/0015214 | A1 | 2/2002 | Nishikitani et al. |

FOREIGN PATENT DOCUMENTS

| | | |
|---|---|---|
| WO | PCT/US98/03862 | 6/1998 |

* cited by examiner

CONTROLLABLY DISSOLVING SPACING MEMBER AND ASSOCIATED ELECTROCHROMIC DEVICE AND METHOD FOR MANUFACTURING THE SAME

This application is a continuation of application Ser. No. 11/416,557, filed May 3, 2006 now U.S. Pat. No. 7,414,770, which is hereby incorporated herein by references in its entirety.

CROSS-REFERENCE TO RELATED APPLICATION(S)

Not applicable

BACKGROUND OF THE INVENTION

1. Field of the Invention

The present invention relates in general to a spacing member and, more particularly, to a spacing member for use in an electrochromic device, (e.g. window, mirror, transparency, etcetera) which facilitates substantially uniform spacing between the substrates of an electrochromic device. A spacing member of the present invention also enhances manufacturing of an electrochromic device by dissolving, at a controlled rate, in the solvent of the electrochromic medium within the electrochromic device.

2. Background Art

Electrochromic devices have been known in the art for several years. Furthermore, the utilization of spacing members (i.e. spacer beads) generally within the seal region of an electrochromic device is likewise well known. See, for example, U.S. Pat. No. 5,790,298 entitled "Method Of Forming Optically Transparent Seal And Seal Formed By Said Method," U.S. Pat. No. 6,157,480 entitled "Seal For Electrochromic Devices," and U.S. Pat. No. 6,195,193, entitled "Seal For Electrochromic Devices," all of which are hereby incorporated herein by reference in their entirety.

While the above-identified references disclose utilizing a plurality of generally non-dissolving spacing members, including glass, plastic, and clay beads or rods, which are generally incorporated into the seal region of an electrochromic device, to the best of Applicant's knowledge, utilizing such spacing members in the in-view region of an electrochromic device can, indeed, be problematic. Such problems include visual irregularities due to, among other things, generally undissolved (i.e. partially dissolved) spacing members which affect coloring and/or clearing of electrochromic devices—just to name a few.

In an attempt to generate uniform cell spacing between substrates in the in-view region of electrochromic devices, spacing members fabricated from polymethylmethacrylate (PMMA) have been utilized. See, for example, U.S. Pat. No. 5,940,201 entitled "Electrochromic Mirror With Two Thin Glass Elements And A Gelled Electrochromic Medium," which is hereby incorporated herein by reference in its entirety. While PMMA based spacing members can be dissolved in certain solvents and, in turn, reduce or eliminate any visual irregularity concerns, PMMA spacing members are highly problematic because it can take several hours to fully dissolve such spacing members in current electrochromic systems—which substantially increases manufacturing time and cost.

In addition, utilizing PMMA based spacing members can be especially problematic if a cross-linked polymer matrix is associated with the electrochromic medium. Specifically, if the cross-linked polymer matrix forms before the PMMA spacing members completely dissolve, it can be extremely difficult, even at elevated temperatures, to avoid visual irregularities associated with even small quantities of undissolved and/or partially dissolved PMMA spacing members.

It is therefore an object of the present invention to provide a spacing member that remedies the aforementioned difficulties and/or complications associated with the utilization of conventional spacing members in electrochromic devices.

These and other objectives of the present invention will become apparent in light of the present specification, claims, and drawings.

SUMMARY OF THE INVENTION

The present invention is directed to an electrochromic device comprising: (a) a first substantially transparent substrate having an electrically conductive material associated therewith; (b) a second substrate having an electrically conductive material associated therewith; and (c) an electrochromic medium contained within a chamber positioned between the first and second substrates which comprises: (1) at least one solvent; (2) at least one anodic material; (3) at least one cathodic material, wherein both of the anodic and cathodic materials are electroactive and at least one of the anodic and cathodic materials is electrochromic; and (4) a spacing member positioned between the first and second substrates, wherein the spacing member comprises a non-polymeric material.

In one aspect of the invention, the spacing member dissolves upon association with the at least one solvent.

In a preferred embodiment of the present invention, the non-polymeric material comprises an ionic salt represented by the following formula:

wherein [C] is a cation selected from the group comprising group I metals, group II metals, group III metals, transition metals, ammonium constituents, phosphonium constituents, and combinations thereof, wherein [A] is an anion selected from the group comprising acetates, amides, arsenates, arsenides, arsenites, benzoates, borates, bromates, brosylates, carbonates, chlorates, chlorites, chromates, cyanates, cyanides, formates, halides, hydroxides, iodates, mesylates, nitrates, nitrides, nitrites, nosylates, oxides, oxalates, perchlorates, peroxides, phosphates, phosphides, sulfates, sulfides, sulfites, sulfonates, tosylates, triflates, and combinations thereof, and wherein x and z are integers such that the net charge of [C][A] is 0. In this embodiment the ionic salt may comprise a group I metal cation and a triflate anion, such as sodium triflate.

In another preferred embodiment of the present invention, the ionic salt is associated with an encapsulant, such as, for example, an additional ionic salt and/or a polymeric material.

In yet another preferred embodiment of the present invention, the electrochromic medium further comprises a cross-linked polymer matrix, a free-standing gel, and/or a substantially non-weeping gel, as well as a redox buffer.

The present invention is also directed to an electrochromic device comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; and (3) at least one cathodic material, wherein both of the anodic and cathodic materials are electroactive and at least one of the anodic and cathodic materials is electrochromic; and (d) wherein the first and second substrates are substantially uniformly spaced apart by a spacing member comprising a non-polymeric material which substantially dissolves upon association with the at least one solvent.

The present invention is further directed to a spacing member for use in an electrochromic device comprising: (a) a first material, wherein the first material is selected from the group comprising an electroactive material, an anodic material, a cathodic material, a non-redox active ionic salt, a polymeric material, a solvent, a light stabilizer, a redox buffer, and combinations thereof; and (b) wherein the first material is at least partially associated with an encapsulant.

In a preferred embodiment of the present invention, the anodic material comprises a phenazine compound; the cathodic material comprises a viologen; the polymeric material comprises a backbone selected from the group comprising polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof; and the encapsulant comprises an ionic salt and/or a polymeric material.

BRIEF DESCRIPTION OF THE DRAWINGS

The invention will now be described with reference to the drawings wherein.

DETAILED DESCRIPTION OF THE INVENTION

Figure 1:
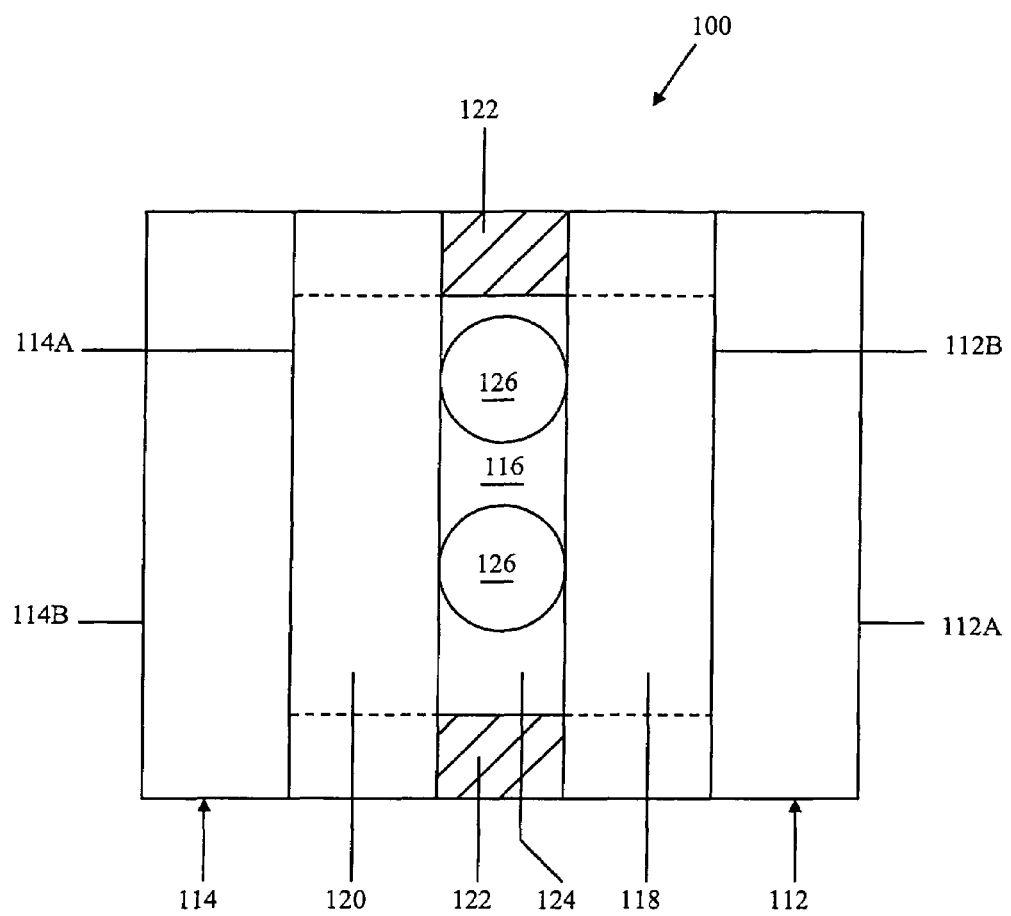
FIG. 1 of the drawings is a cross-sectional schematic representation of an electrochromic device fabricated in accordance with the present invention prior to a spacing member dissolving in an associated solvent.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochromic medium 124 and spacing member 126. It will be understood that electrochromic device 100 may comprise, for illustrative purposes only, a mirror, an architectural window, an aircraft window or transparency, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," and U.S. Pat. No. 6,597,489 entitled "Electrode Design For Electrochromic Devices," both of which are hereby incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm, and more preferably less than approximately 1 mm for certain low weight applications. Of course, the thickness of the substrate will depend largely upon the particular application of the electrochromic device. While particular substrate materials have been disclosed, for illustrative purposes only, it will be understood that numerous other substrate materials are likewise contemplated for use— so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror or comprises a mirrored surface, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm, and more preferably less than approximately 1 mm for certain low weight applications. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

Additionally, the substrates of the present invention can be treated or coated as is described in U.S. Pat. No. 6,239,898, entitled "Electrochromic Structures," U.S. Pat. No. 6,193,378, entitled "Electrochromic Device Having A Self-Cleaning Hydrophilic Coating," and U.S. patent application Ser. No. 09/602,919, entitled "An Electro-Optic Device Having A Self-Cleaning Hydrophilic Coating," the entire disclosures of which are hereby incorporated herein by reference in their entirety including the references cited therein. Other treatments, such as anti-reflectance coatings, low-E coatings, and UV-blocking layers are also contemplated for use in accordance with the present invention.

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116. Alternatively, edge sealing techniques may be utilized which are disclosed in U.S. Patent Application Ser. No. 60/548,472 entitled "Vehicular Rearview Mirror Elements and Assemblies Incorporating These Elements," which is hereby incorporated herein by reference in its entirety.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in: U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," and U.S. Pat. No. 6,157,480 entitled "Seal For Electrochromic Devices," all of which are hereby incorporated herein by reference in their entirety.

For purposes of the present disclosure, electrochromic medium 124 comprises at least one solvent, at least one anodic material, at least one cathodic material, and spacing member 126, preferably associated with a cross-linked polymer matrix, a free-standing gel, and/or a substantially non-weeping gel as is disclosed in U.S. patent application Ser. No. 11/356,356 entitled "Electrochromic Medium Having A Self-Healing, Cross-Linked Polymer Matrix and Associated Electrochromic Device," U.S. patent application Ser. No. 10/662,665, entitled "Electrochromic Medium Having A Self-Healing, Cross-Linked Polymer Gel and Associated Electrochromic Device," and U.S. Pat. No. 6,635,194, entitled "Electrochromic Medium Having A Self-Healing, Cross-Linked Polymer Gel and Associated Electrochromic Device," all of which are hereby incorporated herein by reference in their entirety including the references cited therein.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Furthermore, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572, entitled "Electrochromic Layer And Devices Comprising Same," and International Patent Application Serial No. PCT/US98/05570, entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617, entitled "Electrochromic Compounds," U.S. Pat. No. 6,020,987, entitled "Electrochromic Medium Capable Of Producing A Pre-selected Color," U.S. Pat. No. 6,037,471, entitled "Electrochromic Compounds," and U.S. Pat. No. 6,141,137, entitled "Electrochromic Media For Producing A Preselected Color," all of which are hereby incorporated herein by reference in their entirety.

The anodic and cathodic materials may also be combined or linked by a bridging unit as described in U.S. Pat. No. 6,241,916, entitled "Electrochromic System" and/or U.S. Patent Publication No. 2002/00152214 A1, entitled "Electrochromic Device," which are hereby incorporated herein by reference in its entirety. The electrochromic materials may also include near infrared (NIR) absorbing compounds as described in U.S. Pat. No. 6,193,912, entitled "Near Infrared-Absorbing Electrochromic Compounds And Devices Comprising Same" which is also hereby incorporated herein by reference in its entirety.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369, entitled "Coupled Electrochromic Compounds With Photostable Oxidation States," which is hereby incorporated herein by reference in its entirety.

The concentration of the electrochromic materials can be selected as taught in U.S. Pat. No. 6,137,620, entitled "Electrochromic Media With Concentration Enhanced Stability, Process For The Preparation Thereof, and Use In Electrochromic Devices" the entirety of which is hereby incorporated herein by reference. Additionally, a single-layer, single-phase medium may include a medium where the anodic and cathodic materials are incorporated into a polymer matrix as is described in International Patent Application Serial No. PCT/WO99/02621, entitled "Electrochromic Polymer System" which is hereby incorporated herein by reference in its entirety, and International Patent Application Serial No. PCT/

US98/05570, entitled "Electrochromic Polymeric Solid Films, Manufacturing Electrochromic Devices Using Such Solid Films, And Processes For Making Such Solid Films And Devices."

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device. For example, a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, electron shuttles, and mixtures thereof. Electron shuttles suitable for use in accordance with the present invention include those disclosed in, for example, U.S. Pat. No. 6,700,693 B2, entitled "Electrochromic Devices Having An Electron Shuttle," and redox buffers suitable for use in accordance with the present invention include those disclosed in, for example, U.S. Pat. No. 6,188,505 B1, entitled "Color-Stabilized Electrochromic Devices," which are hereby incorporated herein by reference in their entirety. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; Tinuvin 384 sold by Ciba-Geigy Corp.; the material 3-[3-(2H-benzotriazole-2-yl)-5-(1,1-dimethylethyl)-4-hydroxyphenyl] propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, 5,10-dimethyl-5,10-dihydrophenazine, 2,5,7,10-tetraneopentyl-5,10-dihydrophenazine, 5,10-dineopentyl-5,10-dihydrophenazine, 3,7,10-trimethylphenothiazine, 2,3,7,8-tetramethoxythianthrene, and 10-methylphenothiazine. See, for example, U.S. patent application Ser. No. 11/272,552 entitled "Electrochromic Compounds And Associated Media And Devices," which is hereby incorporated herein by reference in its entirety. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108, entitled "Single-Compartment, Self-Erasing, Solution-Phase Electrochromic Devices, Solutions For Use Therein, And Uses Thereof," as well as U.S. Pat. No. 6,188,505 B1, entitled "Color-Stabilized Electrochromic Devices," and U.S. application Ser. No. 10/054,108, entitled "Controlled Diffusion Coefficient Electrochromic Materials For Use In Electrochromic Mediums And Associated Electrochromic Devices," all of which are hereby incorporated herein by reference in their entirety.

Cathodic materials may include, for example, viologens, such as methyl viologen tetrafluoroborate, octyl viologen tetrafluoroborate, or benzyl viologen tetrafluoroborate. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108, and U.S. application Ser. No. 10/054,108, entitled "Controlled Diffusion Coefficient Electrochromic Materials For Use In Electrochromic Mediums And Associated Electrochromic Devices." Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, a solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitrites, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; cyclic carbonates, including propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In accordance with the present invention spacing member 126 is positioned in the in-view region of electrochromic device 100 within electrochromic medium 124, and serves to maintain first and second substrates 112 and 114, respectively, in a substantially uniformly spaced apart relationship during manufacturing of electrochromic device 100. It will be understood that spacing member 126 dissolves after exposure to and/or association with one or more solvents of electrochromic medium 124 within a predetermined period of time. Inasmuch as spacing member 126 dissolves in the solvent of the medium at a controlled rate, manufacturing of electrochromic device 100 is enhanced in at least two ways, namely: (1) a controlled dissolving rate substantially reduces the net manufacturing time because several hours of exposure to elevated temperature can be avoided which are normally required for PMMA type spacing members to completely dissolve in the solvent of the electrochromic medium; and (2) undesirable visual irregularities associated with undissolved PMMA type spacing members can be avoided as fast dissolving times of certain spacing members precludes any complications associated with a cross-linked polymer matrix fully curing before the spacing members have fully dissolved.

While by no means an absolute prerequisite, it is preferred that the spacing members of the present invention have a melting temperature greater than the temperature required to cure conventional seals, which currently is slightly greater than 200 degrees Centigrade. However, as technology advances and thermal curing resins are replaced with, for example, photo curing resins, substantially lower melting point parameters are envisioned. Moreover, while the present invention is compatible with any one of a number of conventional solvents, it is currently preferred that the spacing members of the present invention be readily soluble in propylene carbonate.

Spacing member 126 is also preferably configured so as to not adversely effect the capabilities and/or robustness of present electrochromic systems.

For purposes of the present disclosure, spacing member 126 may comprise any one of a number shapes, however, generally spherical outer peripheral geometries are preferred for uniform substrate spacing considerations, as well as maximized surface area toward enhancing spacing member dissolving rates.

Without, in any way, being bound by particle size parameters, it will be understood that spacing member 126 may comprise a particle size range of between approximately 100-300 microns for electrochromic mirrors and between approximately 50-2,000 microns for electrochromic windows. While any one of a number of methods can be utilized to obtain a spacing member having a predetermined particle size, including sieving, it is contemplated that spherical spacing members having predetermined particle size can be readily prepared by converting the ionic material from a solid into a liquid and subsequently rapidly cooling the liquid material in a non-dissolving solvent after being, for example, press formed through an aperture. Alternatively, the molten material could be formed into a sphere via conventional piezoelectric nozzle methods.

In a preferred embodiment of the present invention, spacing member 126 comprises a non-polymeric material. Such a non-polymeric material may include an ionic salt. Preferably, the ionic salt comprises a compound represented by the following formula:

$$[C]_x[A]_z$$

wherein [C] is a cation selected from the group comprising group I metals, group II metals, group III metals, transition metals, ammonium constituents, phosphonium constituents, and combinations thereof; wherein [A] is an anion selected from the group comprising acetates, amides, arsenates, arsenides, arsenites, benzoates, borates, bromates, brosylates, carbonates, chlorates, chlorites, chromates, cyanates, cyanides, formates, halides, hydroxides, iodates, mesylates, nitrates, nitrides, nitrites, nosylates, oxalates, oxides, perchlorates, peroxides, phosphates, phosphides, sulfates, sulfides, sulfites, sulfonates, tosylates, triflates, and combinations thereof; and wherein x and z are integers such that the net charge of [C][A] is 0. By way of specific example, sodium triflate, which is available from Aldrich has been experimentally validated to rapidly dissolve in propylene carbonate (within 15-20 minutes at 85 degrees Centigrade), and as such is a highly preferred ionic salt.

Ionic salt spacing members of the present invention can be surrounded in whole or part by an encapsulant which preferably comprises an additional ionic salt and/or a polymeric material. It will be understood that the ionic salt can be encapsulated using any one of a number of conventional techniques including dip coating, fluidized bed coating, and/or drum coating—just to name a few.

Suitable polymeric materials include, for example, polymers having a backbone selected from the group comprising polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

It will be understood that an encapsulant provides greater flexibility with regard to spacing member dissolving rate control. For example, dissolving of the spacing member can be initially hastened by encapsulating the ionic salt with a faster dissolving material. Conversely, dissolving of the spacing member can be encumbered by encapsulating the ionic salt with a slower dissolving material, such as certain polymeric materials.

In another aspect of the present invention, spacing member 126 may comprise a first material, wherein the first material is selected from the group comprising an electroactive material, an anodic material, a cathodic material, a non-redox active ionic salt, a polymeric material, a solvent, a light stabilizer, a redox buffer, and combinations thereof, and wherein the first material is at least partially associated with an encapsulant. Such an encapsulant may comprise an ionic salt and/or polymeric material as disclosed herein above.

In another aspect of the present invention, spacing member 126 may comprise a composite material in which two or more materials are mixed together to form a singe bead, wherein at least the first and second materials, are selected from the group comprising an electroactive material, an anodic material, a cathodic material, a non-polymeric material, a non-redox active ionic salt, a polymeric material, a solvent, a light stabilizer, a redox buffer, and combinations thereof. It will be understood that the composite material may optionally be encapsulated as provided herein.

Figure 2:
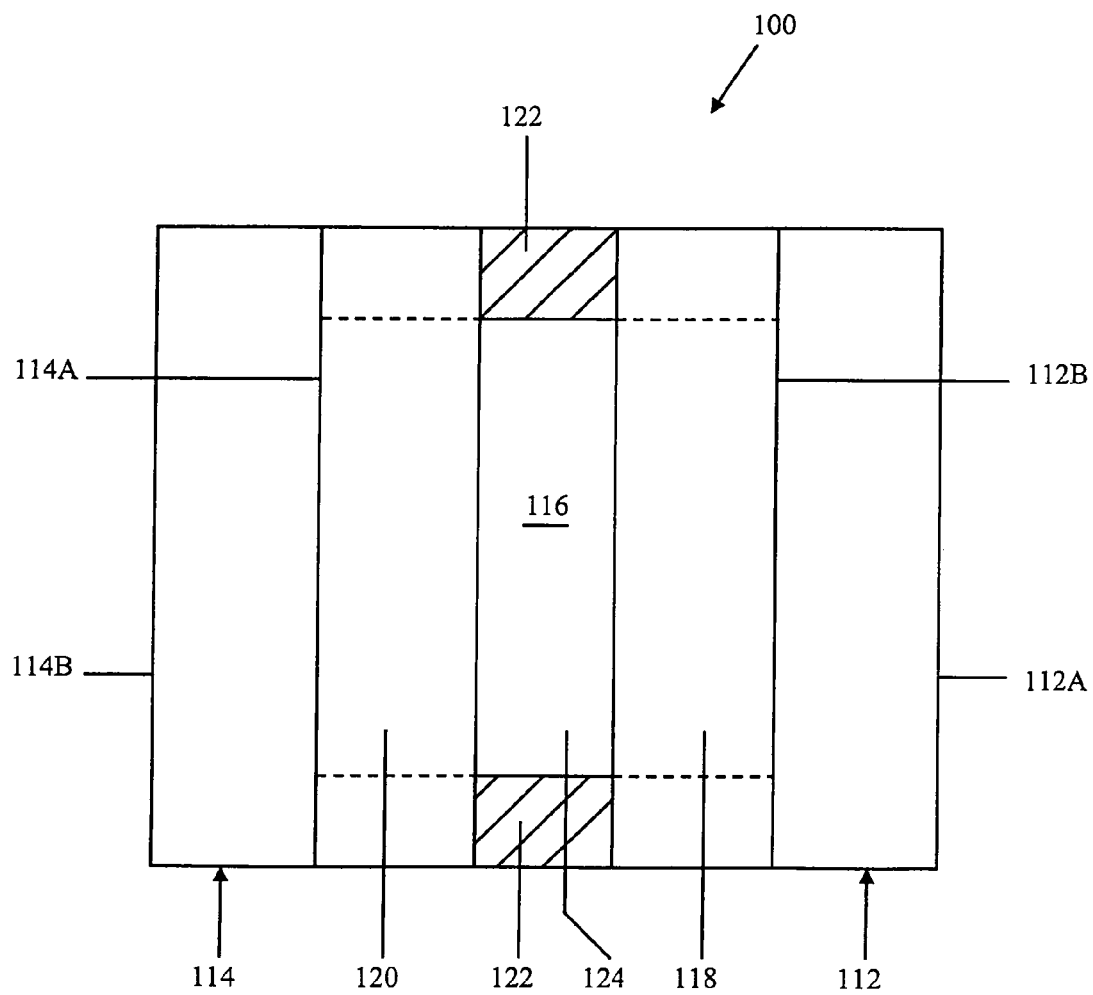
FIG. 2 of the drawings is a cross-sectional schematic representation of an electrochromic device fabricated in accordance with the present invention.

Electrochromic devices of the present invention can be manufactured in accordance with the following process. First and second substrates (112 and 114) are initially provided which have electrically conductive materials (118 and 120, respectively) associated therewith. Seal member 122 is also provided which defines chamber 116. Next, one or more spacing members 126 are introduced between substrates 112 and 114. After the spacing member(s) are introduced into chamber 116 the perimeter seal member 122 is cured, and the chamber is vacuum filled with electrochromic medium 124 via conventional techniques, which typically comprises an anodic material, a cathodic material, a solvent, a redox buffer, an ultraviolet stabilizer, and sometimes an uncured self-healing, cross-linked polymer matrix. At this point, spacing member 126 comprises it greatest outer peripheral geometry as is shown in FIG. 1. Upon association/interaction with the solvent provided within electrochromic medium 124, spacing member 126 begins to dissolve as the cross-linked polymer matrix forms at elevated temperatures. The spacing member is substantially or completely dissolved before the polymer matrix is completely formed. In accordance with the present invention, spacing member 126 substantially or fully dissolves (See FIG. 2) in the solvent (PC) prior to the polymer matrix fully curing. In this way, any visual irregularities caused by spacing member 126 are avoided.

Electrochromic devices of the present invention can be used in a wide variety of applications wherein the transmitted or reflected light/heat can be modulated. Such devices include mirrors; windows for the exterior of a building, home or vehicle; transparencies for aircraft; skylights for buildings including tubular light filters; windows in office or room partitions; and light filters for photographic devices and light sensors.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

The invention claimed is:

1. An electrochromic device, comprising:
   at least one substantially transparent substrate having an electrically conductive material associated therewith; and
   an electrochromic medium which comprises:
   at least one solvent;
   at least one anodic material;
   at least one cathodic material, wherein both of the anodic and cathodic materials are electroactive and at least one of the anodic and cathodic materials is electrochromic; and
   a spacing member which comprises:
   a first material, wherein the first material is selected from the group comprising an electroactive material, an anodic material, a cathodic material, a non-polymeric material, a non-redox active ionic salt, a polymeric material, a solvent, a light stabilizer, a redox buffer, and combinations thereof; wherein the first material is at least partially associated with an encapsulant, and wherein the spacing member at least substantially dissolves upon association with the at least one solvent.

2. The electrochromic device according to claim 1, wherein the spacing member is substantially spherical.

3. The electrochromic device according to claim 1, wherein the encapsulant comprises at least one of an ionic salt and a polymeric material.

4. The electrochromic device according to claim 1, wherein the electrochromic medium further comprises at least one of a cross-linked polymer matrix, a free-standing gel, and a substantially non-weeping gel.

5. The electrochromic device according to claim 1, wherein the electrochromic medium further comprises a redox buffer.

6. An electrochromic device, comprising:
   a first substantially transparent substrate having an electrically conductive material associated therewith;
   a second substrate having an electrically conductive material associated therewith; and
   an electrochromic medium contained within a chamber positioned between the first and second substrates which comprises:
   at least one solvent;
   at least one anodic material; and
   a spacing member positioned between the first and second substrates, wherein the spacing member comprises a cathodic material which is at least partially associated with an encapsulant, and wherein the spacing member at least substantially dissolves upon association with the at least one solvent.

7. The electrochromic device according to claim 6, wherein the spacing member is substantially spherical.

8. The electrochromic device according to claim 6, wherein the encapsulant comprises at least one of an ionic salt and a polymeric material.

9. The electrochromic device according to claim 6, wherein the electrochromic medium further comprises at least one of a cross-linked polymer matrix, a free-standing gel, and a substantially non-weeping gel.

10. The electrochromic device according to claim 6, wherein the electrochromic medium further comprises a redox buffer.

11. The spacing member according to claim 6, wherein the cathodic material comprises a viologen.

12. The spacing member according to claim 6, wherein the cathodic material comprises at least one of methyl viologen tetrafluoroborate, octyl viologen tetrafluoroborate, and benzyl viologen tetrafluoroborate.

13. An electrochromic device, comprising:
    a first substantially transparent substrate having an electrically conductive material associated therewith;
    a second substrate having an electrically conductive material associated therewith; and
    an electrochromic medium contained within a chamber positioned between the first and second substrates which comprises:
    at least one solvent;
    at least one cathodic material; and
    a spacing member positioned between the first and second substrates, wherein the spacing member comprises an anodic material which is at least partially associated with an encapsulant, and wherein the spacing member at least substantially dissolves upon association with the at least one solvent.

14. The electrochromic device according to claim 13, wherein the spacing member is substantially spherical.

15. The electrochromic device according to claim 13, wherein the encapsulant comprises at least one of an ionic salt and a polymeric material.

16. The electrochromic device according to claim 13, wherein the electrochromic medium further comprises at least one of a cross-linked polymer matrix, a free-standing gel, and a substantially non-weeping gel.

17. The electrochromic device according to claim 13, wherein the electrochromic medium further comprises a redox buffer.

18. The spacing member according to claim 13, wherein the anodic material comprises a phenazine compound.

19. The electrochromic device according to claim 13, wherein the anodic material comprises 5,10-dimethyl-5,10-dihydrophenazine.

* * * * *